Patented Oct. 16, 1951

2,571,217

UNITED STATES PATENT OFFICE 2,571,217

PRODUCTION OF HALOHYDRIN ETHERS OF PHENOLS

Orris L. Davis and Horace S. Knight, Berkeley, and John R. Skinner, San Francisco, Calif., assignors to Shell Development Company, San Francisco, Calif., a corporation of Delaware No Drawing. Application May 27, 1949, Serial No. 95,878

8 Claims. (Cl. 260—613)

This invention relates to ethers in which the hydrogen atoms of one or more hydroxyl groups of a phenol have been replaced by aliphatic radicals containing halogen atoms and hydroxyl groups, i. e., to halohydrin ethers of phenols. The invention provides an improved process for producing such ethers by condensing aliphatic compounds containing halogen atoms and epoxide groups with phenols in the presence of catalysts that provide a surprising and greatly improved reaction.

The production of ethers from the reactants employed in the present process necessarily involves a reaction between epoxide and hydroxyl groups such as,

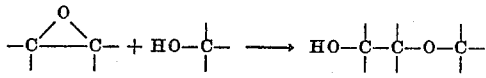

Various procedures are known in the art to cause such a reaction to occur. The reaction can be accomplished in the absence of catalysts; U. S. Patents 1,635,927 and 1,730,061 describe the condensation of hydrocarbon epoxides with phenols at high temperatures and pressures. The uncatalyzed reaction, however, is slow, and a catalyst is required to obtain a practical reaction rate. Both acidic and basic catalysts are known to provide a suitable rate of reaction. When the epoxide compound contains halogen atoms, the ethers contain halohydrin radicals. Halohydrin radicals readily lose a molecule of a hydrogen halide to form epoxide radicals when they are contacted with many basic-reacting compounds (as in the production of epichlorohydrin from the glycerol dihalohydrins). The alkali metal hydroxide catalyzed reaction between compounds containing halogen atoms and epoxide groups is a known method of producing glycidyl ethers which are substantially free of halogen, see for example U. S. Patents 2,221,818 and 2,324,483.

Where a halohydrin ether is desired it has heretofore been necessary to employ acidic catalysts such as acidic inorganic fluorine compounds and metal halides, see for example U. S. Patents 2,260,753, 2,327,053 and 2,428,235. However, when a phenol is so condensed by the action of an acid-reacting catalyst, the yield of halohydrin ether is materially reduced by a different type of further reaction. The acid causes a rearrangement of the halohydrin ether in which the oxy group of the ether becomes the hydroxyl group of a substituted phenol.

The present invention provides a process for producing halohydrin ethers of phenols which substantially completely avoids the disadvantages inherent in the production of such ethers from phenols and compounds containing halogen atoms and epoxide groups by the methods heretofore known. Substantially no monomeric or polymeric glycidyl ethers are formed and substantially no rearrangement of the halohydrin ethers to substituted phenols occurs when halohydrin ethers are produced in accordance with the present invention.

The improved process provided by the invention is made possible by the discovery that one particular class of basic catalysts surprisingly exhibits the properties of both acidic and basic types of catalysts. They resemble the acidic catalysts in that they do not catalyze the conversion of halohydrin ethers to epoxide-containing ethers. They resemble the general class of basic catalysts in that they do not catalyze the rearrangement of halohydrin ethers to substituted phenols. We have found that these properties are unique in the hydroxides and organic oxides of calcium. They are exhibited by calcium hydroxide, as well as by the calcium salts of organic oxy-compounds, i. e., by the calcium phenolates or alcoholates. The term "organic oxides of calcium" is used herein to refer to the calcium salts of the organic oxy-compounds, i. e., of phenols and of alcohols. See Example IV below, under the same conditions alkali metal hydroxides, which are often equivalent to calcium hydroxide, catalyze the reformation of epoxide groups. Even the more closely related alkaline earth metal hydroxides, magnesium hydroxide and barium hydroxide react differently; the former being inactive, and the latter catalyzing the same reaction obtained with the alkali metal hydroxides.

The process of the present invention comprises reacting compounds containing halogen atoms and epoxide groups with phenols in the presence of a hydroxide or organic oxide of calcium. The process provides the surprising result of producing high yields of halohydrin ethers of phenols in the substantially complete absence of glycidyl ethers or substituted-phenol products. The side-reaction products produced by the process are small amounts of dihalohydrins (where the halo-epoxy-reactant is employed in excess), and small amounts of polyaryl ethers of polyhydric alcohols. The former, by the action of a base, can be reconverted to the starting materials, and the latter provides a valuable by-product of the process.

The hydroxides and organic oxides of calcium catalyze the condensation between hydroxyl compounds and epoxy compounds so that a suitable rate of condensation is obtained under the same conditions of temperature, pressure, concentration of reactants and proportions of reactants heretofore used for such reactions.

In general, any temperature from about 0° C. to the decomposition temperature of the reactants can suitably be employed. The range of from about 50° C. to about 100° C. is particularly suitable.

Any pressure above the vapor pressure of the reactants can suitably be employed, and in general, atmospheric pressure is particularly suitable.

The reactants can be diluted with up to about 10 volumes of an organic solvent such as a normally liquid ketone, ether or hydrocarbon. The aliphatic ketones, such as methyl isobutyl ketone, are particularly suitable. The reactants can be employed in equivalent amounts or either may be employed in an excess of up to about 10 to 1. The employment of a molar excess of from about 2 to 4 equivalents of the epoxide reactant is particularly suitable.

The present invention provides a new class of catalysts for the general reaction, the condensation of hydroxy-compounds with epoxy compounds. It has been demonstrated (see Examples I to IV below), that whenever the epoxy compound contains halogen atoms and the hydroxy compound is a phenol, the process of the invention provides the surprising and valuable result mentioned above. The invention is therefore applicable to the employment of any of the epoxide compounds which have heretofore exhibited the property of condensing with a hydroxy compound. In general, any halogen-containing organic compound containing an epoxide ring of not more than four atoms condenses with a phenol to form halohydrin ethers when the reaction is conducted in accordance with the present invention. Substituted aliphatic hydrocarbons containing a vicinal epoxide group (an epoxy oxygen atom attached to adjacent carbon atoms) and at least one halogen atom are preferred reactants, and vicinal epoxy-substituted alkyl chlorides (epichlorohydrin and its homologs) are particularly preferred.

Illustrative examples of epoxide compounds which condense with phenols in the improved manner when the reaction is conducted in accordance with the process of the invention include epichlorohydrin, epibromohydrin, α-methylepichlorohydrin, α,α-diethylbromohydrin, β-heptylepichlorohydrin, epiiodohydrin, epifluorohydrin, chloromethylglycidyl ether, glycidyl chloroacetate, α-cyclohexylepichlorohydrin, β-phenylepibromohydrin, glycidyl chlorobenzoate and α-allylepichlorohydrin.

In general, any phenol is a suitable reactant for use in the present process. The term "phenol" as employed in a generic sense refers to an aromatic hydroxy compound in which hydroxyl groups are directly linked to the aromatic nucleus. Phenols containing a single hydroxyl group or a plurality of hydroxyl groups attached to non-adjacent carbon atoms are preferred, and those which are aromatic hydrocarbons containing one or more uncondensed hydroxyphenyl groups are particularly preferred reactants for employment in the process of the invention.

Illustrative examples of phenols which can be used in the process of the present invention include, phenol and its homologs such as the cresols and the xylenols; resorcinol, hydroquinone, phloroglucinol, 2,2 - bis(4 - hydroxyphenyl)propane, bis(4-hydroxyphenyl)methane, 4,4'-dihydroxydiphenyl, 1,4-dihydroxynaphthalene, 9,10-dihydroxyanthracene and 1,3,6-trihydroxynaphthalene.

The hydroxides and the organic oxides of calcium, i. e., compounds of the formula $Ca(OR)_2$ where R represents hydrogen or an organic radical a carbon atom of which is attached to the oxygen atom of the formula, comprise the catalysts contemplated for employment in the process of the present invention. Calcium hydroxide and the hydrocarbon oxides of calcium (compounds of the above formula where each R represents a hydrocarbon radical) are preferred, and calcium hydroxide and the aryl oxides of calcium are particularly preferred. Illustrative examples of compounds which can suitably be employed as catalysts in the process of the present invention include calcium hydroxide, calcium phenolate, calcium ethylate, calcium actylate, calcium hydroxy butylate, calcium benzylate, the calcium cresolates and the calcium xylolates.

It is preferred to employ the catalyst in less than the amount required to furnish an equivalent of base for each hydroxyl group of the phenol. The range of from 10 to 50 per cent of the equivalent amount is preferred, but amounts substantially in excess of the equivalent amount can suitably be employed.

It is preferred to conduct the process of the invention in a reaction medium containing an appreciable amount of water, from about 1 to 10 moles per mole of the calcium compound being generally suitable. An amount of between about 4 and 9 moles per mole of calcium compound has been found to be particularly suitable.

The hydroxides and organic oxides of calcium can suitably be formed in situ; for example, by a reaction between water and/or the phenol and calcium oxide or metallic calcium in a reaction medium containing the epoxide and phenolic reactants and an appreciable amount of water.

The following examples are presented for the purpose of illustrating in detail the production of various halohydrin ethers of phenols by the process of the invention, and to illustrate the improved results inherent in the use of the catalysts described herein. However, as many variations in reactants and reaction conditions are within its scope, the invention is not to be construed as limited to the materials or conditions recited in the examples.

*Example I*

The glycerol monochlorohydrin ether of phenol (3-chloro-2-hydroxypropyloxybenzene) is produced in accordance with the process of the present invention by heating a mixture of 18 moles of epichlorohydrin, 6 moles of phenol, 7 moles of water and 0.87 mole of calcium hydroxide to a temperature at which reaction occurs (as indicated by the development of heat within the reaction mixture). The reaction products can be isolated by filtering off the solids and fractionally distilling the filtrate.

That the present process is productive of high yields of halohydrin ethers is demonstrated by the fact that when the above reactants were heated for only two hours at 90° C.; 73% of the phenol was converted to ethers, 72% being the halohydrin ether and 28% being diphenyl glycerol ether. A conversion of 15% of the epichlorohydrin to glycerol dichlorohydrin (which by the action of base can be reconverted to epichlorohydrin) constituted the only other product formed from the epichlorohydrin.

That the improved reaction is obtained by the use of the basic compounds of calcium over a wide range of temperatures is demonstrated by the fact that when the same reactants were heated for two hours at 50° C., with the exception that a portion of the phenol was converted to calcium phenolate, the same derivatives of phenol were produced.

is primarily a mixture of the mono and bis-monohalohydrin ethers of 2,2-bis(4-hydroxyphenyl)-propane with a lesser amount of the glycerol ethers.

Example IV

A comparison of various basic catalysts in the reaction between epichlorohydrin and 2,2-bis(4-hydroxyphenyl)propane in a 6 to 1 molar ratio:

| | Catalyst | Per cent required* catalyst | Temp., °C. | Time, hrs. | Per cent Cl | Epoxide value equiv./100 g. |
|---|---|---|---|---|---|---|
| 1 | $Ca(OH)_2 + 9H_2O$ | 25 | 50 | 2.3 | 13.5 | |
| 2 | $Ba(OH)_2 + 9H_2O$ | 25 | 50 | 3.3 | 7.3 | 0.008 |
| 3 | ...do... | 25 | 90 | 1.5 | 9.8 | 0.095 |
| 4 | NaOH | 105 | 90 | 4 | 0.76 | 0.418 |
| 5 | $Ca(OH)_2 + 4H_2O$ | 110 | 90 | 6 | 12.8 | 0.012 |
| 6 | $Mg(OH)_2$ | 25 | 50 | 6 | negligible reaction | |
| 7 | CaO† | 25 | 50–75 | 3 | negligible reaction | |
| 8 | $Na_2CO_3$ | 100 | 100 | 4 | negligible reaction | |

*Based on two equivalents of alkali per mole of 2,2-bis(4-hydroxyphenyl) propane.
†Anhydrous reaction system.

Example II

The glycerol monochlorohydrin ether of phenol (3-chloro-2-hydroxypropyloxybenzene) is produced in accordance with the process of the present invention by heating a mixture of 18 moles of epichlorohydrin, 6 moles of phenol, 7 moles of water and 0.87 mole of calcium phenolate to a temperature at which reaction occurs (as indicated by the development of heat within the reaction mixture). The reaction products can be isolated by filtering off the solids and fractionally distilling the filtrate.

That the present process is productive of high yields of halohydrin ethers is demonstrated by the fact that when the above reactants were heated for only two hours at 90° C., 79% of the phenol was converted to ethers; 76% being the halohydrin ether and 24% being diphenyl glycerol ether. A conversion of 14% of the epichlorohydrin to glycerol dichlorohydrin (which by the action of base can be reconverted to epichlorohydrin) constituted the only other product formed from the epichlorohydrin.

Example III

The glycerol monohalohydrin ethers of 2,2-bis(4-hydroxyphenyl)propane are produced in accordance with the process of the invention by heating a mixture of 3 moles of 2,2-bis(4-hydroxyphenyl)propane, 18 moles of epichlorohydrin, 0.87 mole of calcium hydroxide and 8 moles of water to a temperature at which reaction occurs. A mixture of the ethers of the phenol can be isolated by filtering the reaction mixture and fractionally distilling off the unconverted reactants and volatile components of the filtrate.

That the process of the invention is adapted to the production of halohydrin ethers of polyhydric phenols was demonstrated by isolating from the reaction products obtained by heating the above reactants for seven hours at 90° C., a mixture of phenyl ethers having an epoxide value of less than 0.01 and containing 13.5% chlorine. A yield of glycerol dichlorohydrin amounting to about a 20% conversion of the epichlorohydrin was also isolated from the liquid reaction products. As the mono and bis-monochlorohydrin ethers of 2,2-bis(4-hydroxyphenyl)propane contain 11.0% and 17.2% chlorine, respectively, and as a reaction of the mixture obtained from the above reaction with sodium hydroxide results in a marked increase in the epoxide value; the mixture That the improved catalysis of the formation of the halohydrin ethers of phenols is a unique property of the hydroxides and organic oxides of calcium is indicated by the fact that under the same conditions the use of sodium hydroxide caused the reformation of epoxide groups (or a metathetical reaction between the epichlorohydrin and a sodium salt of the phenol), barium hydroxide caused the hydrolysis of most of the chlorine groups, magnesium hydroxide, calcium oxide and sodium carbonate caused substantially no reaction, but the use of calcium hydroxide caused an etherification reaction similar to those described in greater detail in the preceding examples.

We claim as our invention:

1. A process for the production of phenyl glycerol monochlorohydrin ether which comprises reacting phenol and epichlorohydrin at a temperature of from about 50° C. to about 100° C. in the presence of calcium hydroxide.

2. A process for the production of phenyl glycerol monochlorohydrin ether which comprises reacting phenol and epichlorohydrin at a temperature of from about 50° C. to about 100° C. in the presence of calcium phenolate.

3. A process for the production of glycerol monochlorohydrin ethers of 2,2-bis(4-hydroxyphenyl)propane which comprises reacting 2,2-bis(4-hydroxyphenyl)propane and epichlorohydrin at a temperature of from about 50° C. to about 100° C., the improvement which comprises conducting the reaction in the presence of calcium hydroxide.

4. A process for the production of glycerol monochlorohydrin ethers of phenols which comprises reacting epichlorohydrin and a phenol in the presence of a compound of calcium selected from the class consisting of calcium hydroxide, calcium phenolates and calcium alcoholates.

5. The process of claim 4 in which calcium hydroxide is employed as the catalyst.

6. The process of claim 4 in which calcium phenolate is employed as the catalyst.

7. A process for the production of halohydrin ethers of phenols which comprises reacting a phenol with a halo-substituted epoxide compound, wherein the halogen and epoxide groups are the only functional groups, in the presence of a calcium phenolate.

8. A process for the production of halohydrin ethers of phenols which comprises reacting a phenol with a halo-substituted epoxide compound, wherein the halogen and epoxide groups are the only functional groups, in the presence of a compound of calcium selected from the class consisting of calcium hydroxide, calcium phenolates and calcium alcoholates.

ORRIS L. DAVIS.
               HORACE S. KNIGHT.
               JOHN R. SKINNER.

REFERENCES CITED

The following references are of record in the file of this patent:

UNITED STATES PATENTS

| Number | Name | Date |
| --- | --- | --- |
| 1,971,662 | Schmidt | Aug. 28, 1934 |
| 2,428,235 | Marple | Sept. 30, 1947 |